United States Patent [19]

Pollard et al.

[11] Patent Number: 5,012,371
[45] Date of Patent: Apr. 30, 1991

[54] DISK DRIVE CRASH STOP/ACTUATOR LATCH

[75] Inventors: Christopher A. Pollard, Monument; James W. Boeckner, Jr., Broomfield, both of Colo.

[73] Assignee: MiniScribe Corporation, Longmont, Colo.

[21] Appl. No.: 314,408

[22] Filed: Feb. 22, 1989

[51] Int. Cl.$^5$ .................. G11B 5/54; G11B 21/22
[52] U.S. Cl. ........................ 360/105; 360/104
[58] Field of Search ............ 360/105, 104, 106

[56] References Cited

U.S. PATENT DOCUMENTS

| | | | |
|---|---|---|---|
| 4,139,874 | 2/1979 | Shiraishi | 360/86 |
| 4,237,504 | 12/1980 | Ho et al. | 360/106 |
| 4,266,441 | 5/1981 | Stordeur | 74/523 |
| 4,331,989 | 5/1982 | Viskochil | 360/86 X |
| 4,484,241 | 11/1984 | Brende et al. | 360/105 |
| 4,562,500 | 12/1985 | Bygdnes | 360/105 |
| 4,583,142 | 4/1986 | Skarky | 360/105 |
| 4,594,627 | 7/1986 | Viskochil et al. | 360/105 |
| 4,635,151 | 1/1987 | Hazebrouck | 360/105 |
| 4,647,997 | 3/1987 | Westwood | 360/105 |
| 4,654,735 | 3/1987 | Izraelev et al. | 360/105 X |
| 4,692,829 | 9/1987 | Campbell | 360/105 |
| 4,706,142 | 11/1987 | Hattori et al. | 360/105 |
| 4,716,480 | 12/1987 | Wiens et al. | 360/105 |
| 4,725,907 | 2/1988 | Jue | 360/105 |
| 4,864,444 | 9/1989 | Liu et al. | 360/105 |
| 4,868,695 | 9/1989 | Quatso et al. | 360/105 |
| 4,881,139 | 11/1989 | Hazebrouck | 360/105 |

OTHER PUBLICATIONS

Brende et al., "Magnetic Home Latch Assembly", IBM TDB, Aug. 1983, vol. 26, No. 3B, pp. 1693–1694.

*Primary Examiner*—David J. Severin
*Attorney, Agent, or Firm*—Curtis, Morris & Safford

[57] ABSTRACT

A limit stop/latching assembly in a disk storage system includes a crash stop for limiting travel of the actuator carriage at a fixed stop position. The assembly has a first abutment surface defining the stop position, a stop pin on the actuator carriage movable in a path by travel of the actuator carriage to abut the first abutment surface, and a latch having a second abutment surface which is movable between a free position out of the path of the stop pin and a latched position with the second abutment surface abuting the stop pin and facing the first abutment surface across the path to latch the stop pin at the stop position. Advantageously, the latch is mounted for movement around a first mounting pin in rotary travel having a center defined by the crash stop pin.

22 Claims, 4 Drawing Sheets

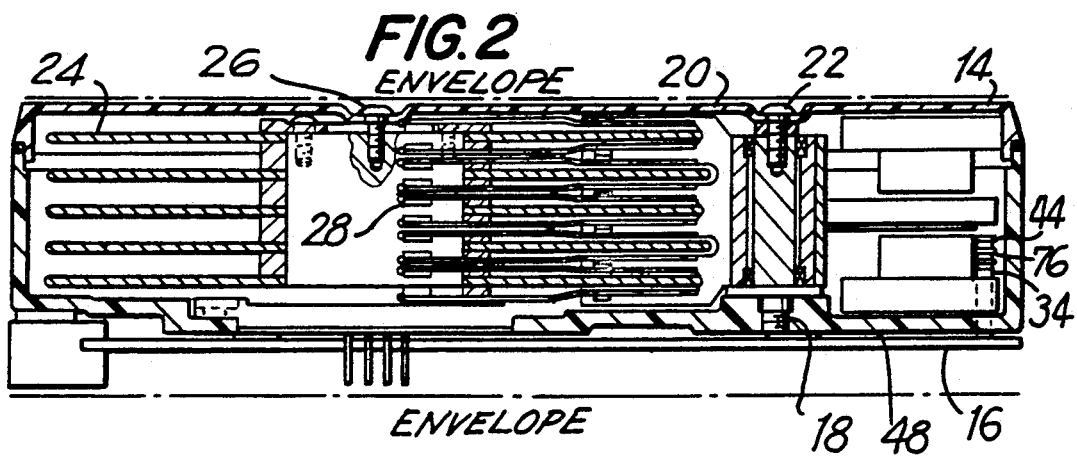
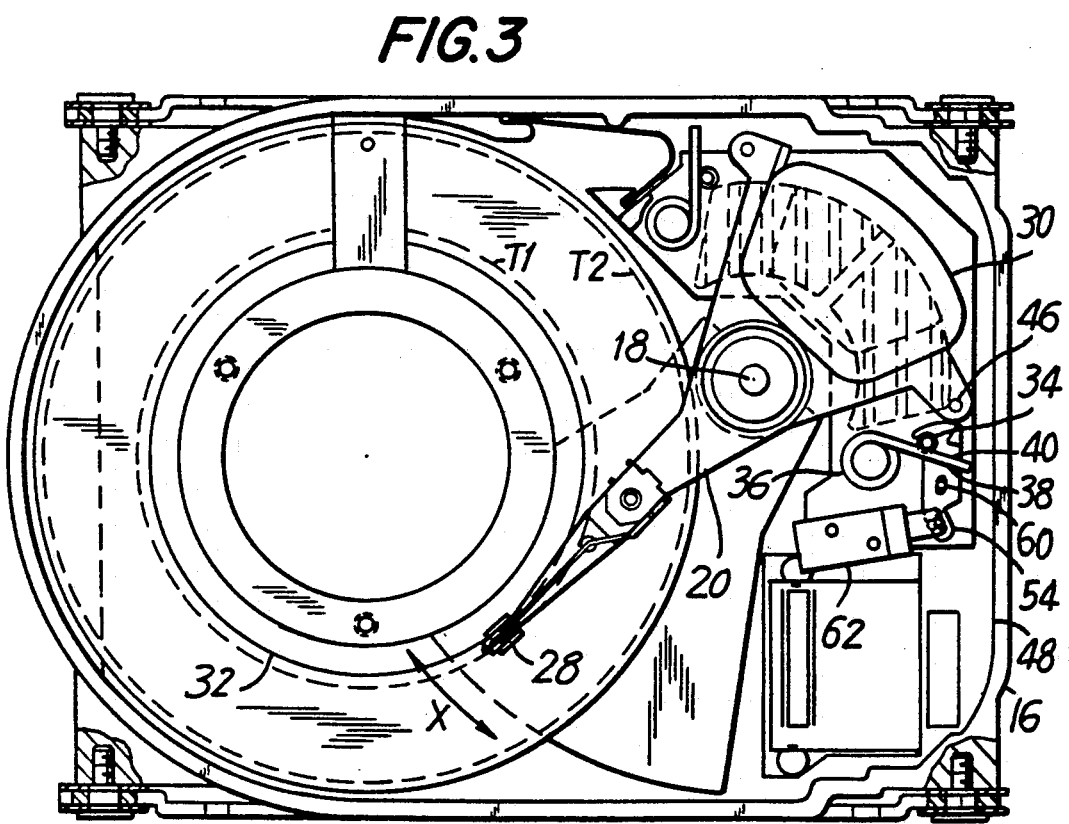

DISK DRIVE CRASH STOP/ACTUATOR LATCH

FIELD OF THE INVENTION

The present invention is generally directed to disk storage systems and more particularly is directed to a limit stop/latching assembly for holding an actuator carriage at a predetermined stop position.

BACKGROUND OF THE INVENTION

In a hard or floppy disk drive system, a read/write head is moved across a data storage disk so as to be positioned over a selected one of the large number of substantially circular, concentric tracks in which data is recorded and/or reproduced The head is mounted on an actuator carriage so as to be positioned at the desired track. The actuator carriage may either move linearly along a radius of the disk to position the head, or it may be adapted for rotary travel around an axis to move the head radially across the disk surface from the innermost track to the outermost track.

In most hard disk drive systems, a plurality of disks are stacked on a spindle and a corresponding plurality of magnetic heads are used to read and/or write on respective surfaces of the disks. The magnetic heads "fly" over the surfaces of the disks on an air cushion generated by the rapid rotation of the disks themselves. When power is turned off, the actuator carriage is driven to move the magnetic heads to an information-free parking or landing zone on which they may rest without destroying information, which is recorded only in other areas of the disks. Typically, the actuator carriage brings the heads quickly to the parking zone in case of error or loss of power, and generally a crash stop is provided to limit further movement of the actuator carriage once it reaches its stop position in the parking zone. The crash stop is conventionally in the form of a pin which may or may not be preloaded. Given the relatively small sizes of disk drives, for example to read and write on a 3½ inch disk, it is a significant part of the design of the disk drive to precisely position the actuator carriage at its stop position so as to minimize the area of the information-free parking zone, which is essentially wasted disk surface space since no information can be recorded therein, while being certain that the heads will not be moved too far and off the surface of the disk.

Once the actuator carriage has been moved to its rest position abuting the crash stop, it is frequently desirable to latch the actuator carriage, for example when the disk drive is being moved, so that the heads will not move from the parking zone. The latch itself has to fit and function within the strict design tolerances for the disk drive system. It must also be surely moved between its free position, at which the actuator carriage is free to move the heads across the surface of the disk, and its latched position, at which the actuator carriage is held at its stop position. While it is known to use a solenoid to move the latch back and forth between the free and latched positions, it is undesirable to use the solenoid to actively hold the latch at either position, since this would require a constant current and therefore a constant drain on a battery or other power source. Instead, it is preferable to actuate the solenoid merely to move the latch between the two positions. However, the actuator carriage is heavy relative to the latch and will therefore exert some force on the latch when the disk drive is tilted or shaken during movement. Some conventional disk drive systems have therefore actively held the latch against the actuator carriage to latch the actuator, or have actively held the latch in the free position and used a spring to force the latch to the latched position and hold it there against the actuator.

OBJECTS AND SUMMARY OF THE INVENTION

Therefore, it is an object of the present invention to provide a disk storage system which avoids the above-described difficulties of the prior art.

It is another object of the present invention to provide a disk storage system and a limit stop/latching apparatus therefor which surely latches the actuator carriage at a predetermined stop position.

It is yet another object of the present invention to provide a limit stop/latching apparatus for a disk drive system in which the stop forces for latching the actuator carriage are received within the latch itself.

It is still another object of the present invention to provide a rotary disk storage system and limit stop/latching apparatus therefor which is adapted to latch the actuator carriage at a precisely defined position relative to the actuator carriage.

In accordance with an aspect of the present application, a limit stop/latching assembly in a disk storage system having an actuator carriage mounted for travel in a plane comprises crash stop means for limiting travel of the actuator carriage at a fixed stop position and having a first abutment surface defining the stop position, a stop pin on the actuator carriage movable in a path by travel of said actuator carriage to abut the first abutment surface at the stop position, latch means having a second abutment surface for selectively latching the stop pin at the stop position, and means for moving the latch means between a free position out of the path of the stop pin and a latched position with the second abutment surface abuting the stop pin and facing the first abutment surface across the path to latch the stop pin at the stop position.

Advantageously, the limit stop/latching assembly is utilized in a rotary disk storage system in which the actuator carriage is mounted for rotary travel in the plane and the latch means is also mounted for rotary travel parallel to the plane but eccentric to the rotary travel of the actuator carriage.

In another aspect of the present invention, a rotary disk storage system comprises a plate, a shaft mounted at a first point on the plate, a rotary actuator carriage mounted for rotary travel about the shaft and having a stop pin extending therefrom, a crash stop pin mounted at a second point on the plate, and crash stop means for limiting rotary travel of the actuator carriage at a stop position, the crash stop means having an abutment surface defining the stop position and the abutment surface being positioned by the crash stop pin. The system further includes latch means for selectively latching the stop pin at the stop position and means for moving the latch means between a free position out of contact with the actuator carriage and a latched position at which it latches the stop pin against the abutment surface at the stop position.

In accordance with a further aspect of the present invention, a rotary disk storage system comprises a plate, a shaft mounted on the plate, a rotary actuator carriage mounted for rotary travel about the shaft and having a stop pin extending therefrom, and crash stop means mounted on the plate for limiting rotary travel of the actuator carriage at a stop position, the crash stop means having an abutment surface defining the stop position. This system further comprises latch means for selectively latching the stop pin at the stop position, the latch means including a latch member, a first mounting pin mounted at a first point on the plate and a second mounting pin mounted at a second point on the plate, and means for moving the latch means about the first mounting pin in rotary travel having a center defined by the second mounting pin between a free position and a latched position at which the stop pin is latched against the abutment surface at the stop position.

These and other objects, aspects and features of the present invention will become apparent from the following detailed description of a preferred embodiment thereof taken in connection with the accompanying drawings, throughout which like reference numerals denote like elements and parts.

BRIEF DESCRIPTION OF THE DRAWINGS

FIG. 2 is a side cross sectional view of the apparatus taken along lines A—A in FIG. 1;

FIG. 3 is a top plan view of the apparatus of FIG. 1 with a top plate of the apparatus removed;

DETAILED DESCRIPTION OF THE PREFERRED EMBODIMENT

Figure 1:
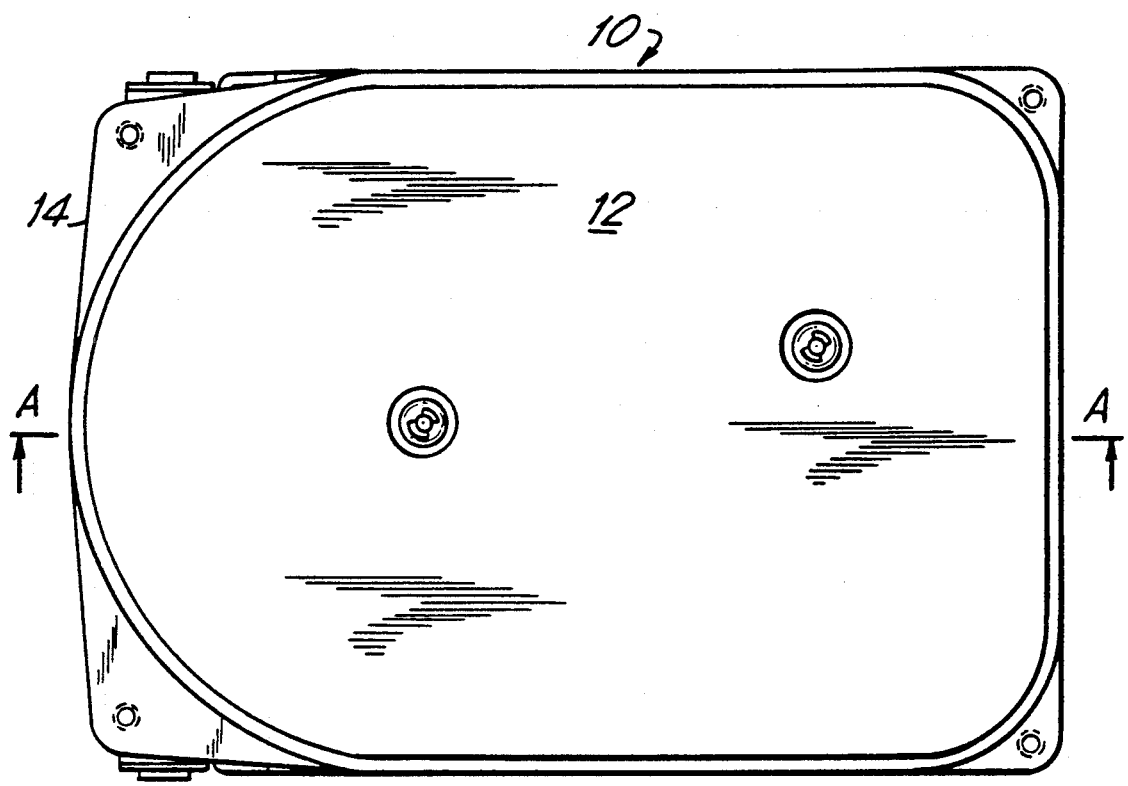
FIG. 1 is a top plan view of a preferred embodiment of apparatus in accordance with the present invention.

Referring now to the drawings and initially to FIGS. 1 and 2 thereof, the present invention will be described in the context of a hard disk drive system using a rotary head actuator carriage. It will be understood, however, that the present invention may also be applied to hard disk drive systems using linear head actuator carriages, as well as to floppy disk drive systems or other systems in which an actuator carriage may be moved to a stop position and latched thereat.

As shown in FIG. 1, the hard disk drive system 10 has an outer envelope 12 in which the disks, actuator carriage and other elements are housed and supported between an upper plate 14 and a lower plate 16 (FIG. 2). Upper and lower plates 14 and 16 together define a box-like cavity in which the other elements are housed. Upper and lower plates 14, 16 are held together to provide dust-free environment for these elements within envelope 12. As shown in FIG. 2, one or more pins or spindles are mounted to lower plate 16 and upper plate 14 is mounted to the spindles by means of, for example, screws. In the illustrated embodiment, an actuator spindle 18 for pivotally mounting the head actuator carriage 20 is mounted on lower plate 16 and a first screw 22 is used to mount upper plate 14 to actuator spindle 18. In addition, a second, disk spindle (not illustrated) upon which a plurality of hard disks 24 are mounted is provided, and a second screw 26 also mounts upper plate 14 to the disk spindle. The attachment of the upper and lower plates 14, 16 to each other through the use of two separate pin structures at different positions between the plates 14, 16 provides a rigid support for disks 24 and actuator carriage 20 and reduces both bending and vibration of the envelope 12 and the interior elements.

In the illustrated embodiment, five disks 24 are mounted on the same disk spindle and ten heads 28 are supported by actuator carriage 20 for reading the upper and lower surfaces of disks 24, respectively. Actuator carriage 20 is a rotary head actuator carriage mounted for rotary travel in a plane about spindle 18. As shown more clearly in FIG. 3, actuator carriage 20 is pivotable about actuator spindle 18 in either the clockwise or counterclockwise directions as shown by double headed arrow X. Mounted on actuator carriage 20 is an actuator motor 30, advantageously a voice coil motor, which may be driven to move actuator carriage 20 in the clockwise or counterclockwise directions to move heads 28 across the disk surfaces to overlie a selected one of the large number of substantially circular, concentric tracks on disks 24 in which data may be recorded and/or from which data may be read, from an innermost track T1 to an outermost track T2.

Actuator motor 30 is advantageously driven in response to an error condition or the termination of power to disk drive system 10 to move actuator carriage 20 to an extreme or "stop" position at either the inner or outer circumference of disks 24 over an information-free landing or parking zone 32 where no data is recorded. In the illustrated embodiment parking zone 32 is located at the inner circumference of disks 24, although it may be located at the outer circumference of disks 24 in other embodiments. As is conventional in hard disk drive systems, heads 28 normally "fly" over the surface of disks 24 on an air cushion created by the rapid rotation of disks 24 when disk drive system 10 is operative. Heads 28 come to rest against respective surfaces of disks 24 when disk drive system 10 is powered down either through the intentional termination of power or in response to a detected error condition. Parking zone 32 provides an area on which heads 28 may safely rest without destroying any information, since no information is recorded therein. However, the existence of parking zone 32 inherently reduces the area of the surfaces of disks 24 in which data may be recorded and so it is advantageous to minimize the area of parking zone 32.

Although an electronic braking circuit is conventionally provided to bring actuator carriage 20 to rest with heads 28 over parking zone 32 in response to error or power termination conditions, it may happen that the error conditions prevent the accurate functioning of the electronic braking circuit, and therefore a mechanical crash stop system is provided for physically preventing the pivoting of actuator carriage 20 beyond its stop position. Conventionally, this crash stop system includes a crash stop pin which is mounted on one of the upper or lower plates of disk drive system 10 and against which actuator carriage 20 impacts if it is driven up to and beyond the stop position. If the crash stop pin provides a decelerating force directly proportional to its deflection upon impact, it is termed a "non-preloaded" crash stop. If, however, the crash stop pin is biased to provide an immediate and substantial decelerating force upon impact, it is termed a "preloaded" crash stop. This preloading may be achieved, for example, by the provision of an elastomeric, springy surface on the crash stop pin, or may be provided by structuring the crash stop pin itself as a spring or the equivalent.

Figure 4:
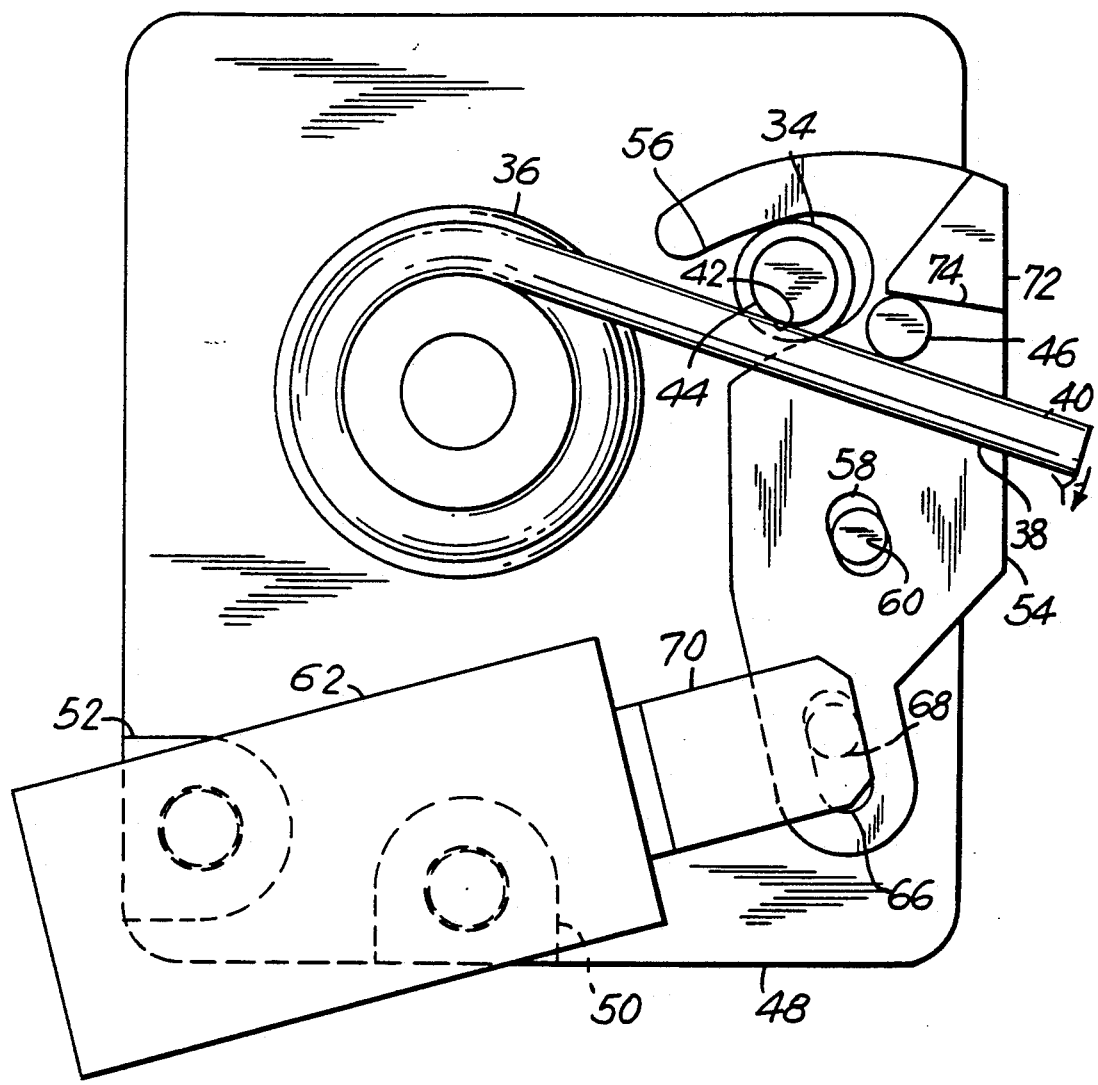
FIG. 4 is a top plan view of a limit stop/latching assembly in a latched position in accordance with the present invention.

In the illustrated embodiment of the present invention, the crash stop system includes a crash stop pin 34 mounted on lower plate 16 (or on an auxiliary lower plate, as discussed below) at a predetermined position thereon, and a coil spring 36 having a substantially straight end portion 38 extending therefrom. End portion 38 functions as an elongated spring portion and has an abutment surface 40 adapted to contact one side 42 (shown in FIGS. 4 and 5) of crash stop pin 34. Side 42 has a stepped surface having a first step 44 at a first radius which is adapted to matingly receive the curved surface of end portion 38. Actuator carriage 20 in turn carries an elongated stop pin 46, best seen in FIGS. 4 and 5 which is movable in a path P (FIG. 5) by the rotary travel of actuator carriage 20 in the clockwise and counterclockwise directions to position heads 28 at the desired track. In the extreme clockwise position as shown in FIGS. 3 and 4 actuator carriage 20 is moved to its stop position at which heads 28 overlie parking zone 32. At this stop position of actuator carriage 20, stop pin 46 itself is at a stop position abuting the abutment surface 40 of end portion 38.

Figure 5:
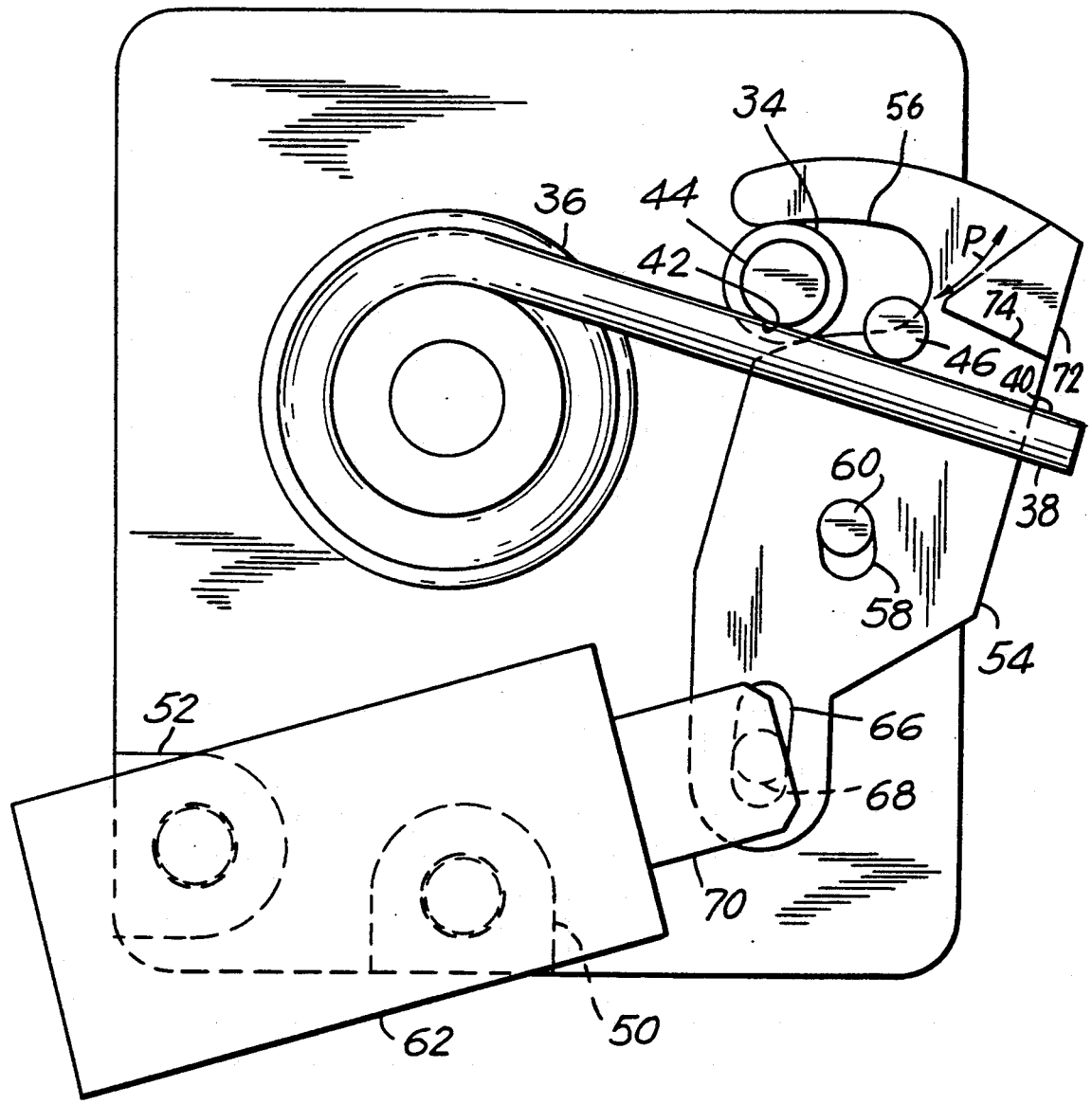
FIG. 5 is a top plan view of the limit stop/latching assembly of FIG. 4 in a free position.

This structure is most clearly seen in FIGS. 4 and 5 which illustrates the construction of the crash stop system and a limit stop/latching assembly associated therewith in disk drive system 10, but with the unrelated elements illustrated in FIGS. 2 and 3 being removed for clarity of illustration. As shown in FIG. 4, stop pin 46 comes to its stop position abutting the abutment surface 40 of end portion 38. No portion of actuator carriage 20 therefore abuts or hits crash stop pin 34 itself. Rather, crash stop pin 34 serves to position end portion 38 and consequently abutment surface 40. An advantage of this construction is that crash stop pin 34 may be mounted at a precisely determined position on lower plate 16, or, as shown in FIG. 4, on an auxiliary lower plate 48 mounted in turn on lower plate 16. Auxiliary lower plate 48 is bolted to lower plate 16 by, for example, bolts 50, 52. Actuator spindle 18 is also mounted at a precisely defined position on lower plate 16 or auxiliary lower plate 48, with the result that the stop position of actuator carriage 20 may in turn may be precisely defined by the two positions of actuator spindle 18 and crash stop pin 34 extending from the same plate structure.

At the same time, the physical element presenting the abutment surface 40, that is, end portion 38, functions as a spring element. In particular, the precise position of abutment surface 40 of end portion 38 is determined not by the outer radius of crash stop pin 34, but rather by the radius defined by step 44. Thus, the crash stop system in accordance with the present invention is not only precisely positioned within critical design tolerances, but is also constructed as a preloaded crash stop, which is known to provide superior results in stopping the travel of actuator carriage 20 within a smaller deflection and preventing the application of excessively high deceleration forces, which have been found by those under an obligation of assignment to the assignee of the present invention to result in undesirable crashing of the heads to the surfaces of the disks 24.

Therefore, in accordance with an aspect of the present invention, actuator carriage 20 may be precisely located at its stop position. In accordance with a further aspect of the present invention, actuator carriage 20 may be latched at its stop position by a latching assembly which takes the stop forces within itself. As a further benefit of this arrangement, the number of tolerances is minimized in determining the positioning of the pin relative to the latch so that the latch assembly can be assembled without adjustment and yet give an accurate adjustment to the pin. This latching assembly is shown in its latched position in both FIGS. 3 and 4, and in its free position in FIG. 5. As shown in FIG. 4, this latching assembly includes a latch member 54 having two elongated slots 56, 58 formed therein and each adapted to matingly receive a respective pin mounted on auxiliary plate 48. In the illustrated embodiment, elongated slot 56 matingly receives crash stop pin 34 and extends in a segment of a circle defining the direction of rotary travel of latch member 54. Elongated slot 58 receives a mounting pin 60 and extends generally perpendicular to slot 56. Latch member 54 is moved in its path of rotary travel by means of a solenoid 62 which is connected to latch member 54 by means of, for example, a third elongated slot 66 extending through latch member 54 and a pin 68 extending from a movable portion 70 of solenoid 62. When movable portion 70 is in its furthest extended position as shown in FIGS. 3 and 4, latch member 54 will be rotated around mounting pin 60 in rotary travel having a center defined by crash stop pin 34. That is, latch member 54 can move only as permitted by crash stop pin 34 fitted within slot 56, which is in the segment of the circle defined by the curve of first slot 56. In doing so, latch member 54 pivots around mounting pin 60, while the extra length of elongated slot 58 permits radial motion of latch member 54 with respect to mounting pin 60 so as to permit the rotary travel around the center defined by the circular curve of first slot 56. Pin 68 within third elongated slot 66 also accommodates the radial motion of latch member 54 with respect thereto.

Figure 6:
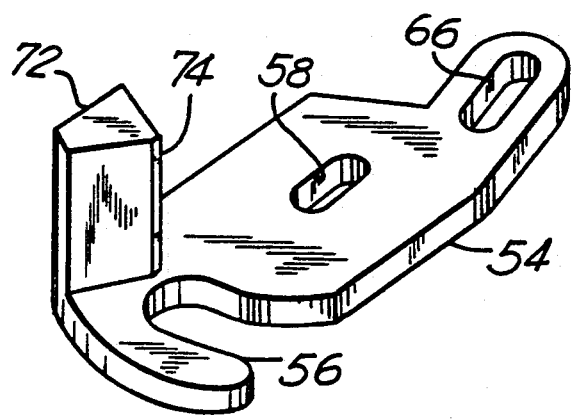
FIG. 6 is an elevational view of a latch member of the limit stop/latching assembly of FIG. 4.

In order to latch stop pin 46 at its stop position, latch member 54 has an abutment 72 which, as shown in FIG. 6, rises substantially perpendicularly from latch member 54 and presents a second abutment surface 74 also substantially perpendicular to latch member 54 and substantially perpendicular to the plane of travel of actuator carriage 20. As shown in FIG. 5, stop pin 46 is movable along path P to its stop position abutting abutment surface 40 of terminal portion 38, and after latch member 54 has been rotated counterclockwise about the circle defined by crash stop pin 34 to its latched position, as shown in FIG. 4, second abutment surface 74 will face first abutment surface 40 across the rotary path P of travel of stop pin 46 and will therefore prevent any motion of stop pin 46, or actuator carriage 20 carrying stop pin 46, from the stop position. Furthermore, since the rotary travel of latch member 54 is eccentric to the rotary travel of actuator carriage 20, the weight of actuator carriage 20 to pull stop pin 46 from its stop position will pull stop pin 46 directly against second abutment surface 74, but not in the direction so as to cause rotation of latch 54. Therefore, the stop forces for holding actuator carriage 20 at its stop position will be taken entirely between end portion 38 and abutment 72 and it is unnecessary to actively hold latch 54 at its latched position. When, movable portion 70 of solenoid 62 is withdrawn, as shown in FIG. 5, latch member 54 is rotated clockwise around second mounting pin 60 to its free position with second abutment surface out of the path P of stop pin 46.

In a further development of the present invention, crash stop pin 34 may be provided with a second step 76 (FIG. 2) at a second radius for repositioning abutment surface 40 of end portion 38 relative to actuator spindle 18. As shown in FIG. 2, in the illustrated embodiment second step 76 is shallower than first step 44, so that end portion 38 will be positioned slightly further in the clockwise direction of FIG. 4, as shown by arrow Y. As a result, crash stop pin 46 will travel slightly further before impacting abutment surface 40, and the stop position of actuator carriage 20 will be correspondingly dispaced. This slight further displacement is required in order that servo information is available beyond the normal stop position. End portion 38 is moved downwardly in FIG. 2 from first step 44 to second step 76, or upwardly from second step 76 to first step 44. Alternatively, a second step may be deeper than first step 44 to reposition abutment surface 40 of end portion 38 slightly in the counterclockwise direction of FIG. 4.

The present invention has been described with respect to a preferred embodiment thereof, but it will be apparent to one of ordinary skill in the art that many changes and modifications may be made therein without departing from the spirit and scope of the present invention, which is to be determined by reference to the appended claims.

We claim:

1. A limit stop/latching assembly in a disk storage system having a movable actuator carriage, said assembly comprising:
    crash stop means for limiting travel of said actuator carriage at a fixed stop position and having a first abutment surface defining said stop position;
    a stop member movable with said actuator carriage in a path of travel of said actuator carriage to abut said first abutment surface at said stop position;
    latch means having a second abutment surface for selectively latching said stop member at said stop position, said latch means including first and second mounting pins and a latch member; and
    means for moving said latch means between a free position out of said path of said stop member and a latched position with said second abutment surface abutting said stop member and facing said first abutment surface across said path to latch said stop member at said stop position, said moving means moving said latch member about said first mounting pin in rotary travel such that movement of said latch means is confined by said second mounting pin.

2. A limit stop/latching assembly according to claim 1; wherein said latch means includes the latch member having an abutment extending in a direction that intersects the travel direction of said actuator carriage and presenting said second abutment surface generally perpendicular to said travel direction.

3. A limit stop/latching assembly according to claim 1; wherein said actuator carriage is mounted for rotary travel for moving said stop member in said path.

4. A limit stop/latching assembly according to claim 3; wherein said latch means is mounted for rotary travel eccentric to said rotary travel of said acutator carriage.

5. A limit stop/latching assembly according to claim 1; wherein said crash stop means includes a crash stop pin fixedly mounted with respect to said actuator carriage and a spring member having an elongated spring portion adapted to abut said crash stop pin and extend therebeyond across said path, a surface of said spring member constituting said first abutment surface defining said stop position.

6. A limit stop/latching assembly according to claim 5; wherein said crash stop pin includes a stepped surface having a first step at a first radius for receiving said spring portion to define said stop position, said stepped surface further having a second step at a second radius for receiving said spring portion to define a second stop position.

7. A limit stop/latching assembly according to claim 5; wherein said spring member includes a coil spring having said elongated spring portion as a substantially straight end portion extending therefrom.

8. A limit stop/latching assembly according to claim 1; wherein said latch member includes first and second extended slots for matingly receiving said first and second mounting pins, respectively, said second extended slot extending in a curve defining the direction of rotary travel of said latch member, and said first slot extending generally perpendicular to said second slot.

9. A limit stop/latching assembly according to claim 8; wherein said means for moving includes solenoid means for moving said latch member about said first mounting pin.

10. A limit stop/latching assembly according to claim 8; wherein said crash stop means includes a crash stop pin fixedly mounted with respect to said actuator carriage and a spring member having an elongated spring portion adapted to abut said crash stop pin and extend therebeyond across said path, a surface of said spring portion constituting said first abutment surface defining said stop position.

11. A limit stop/latching assembly according to claim 10; wherein said second mounting pin constitutes said crash stop pin.

12. A rotary disk storage system comprising:
    a plate;
    a shaft mounted at a first point on said plate;
    a rotary actuator carriage mounted for rotary travel about said shaft and having a stop member extending therefrom;
    a crash stop pin mounted at a second point on said plate;
    crash stop means for limiting rotary travel of said actuator carriage at a stop position, said crash stop means having an abutment surface defining said stop position and said abutment surface being positioned by said crash stop pin;
    latch means for selectively latching said stop member at said stop position, said latch means including first and second mounting pins and a latch member; and
    means for moving said latch means between a free position out of contact with said actuator carriage and a latched position in which said latch means latches said stop member against said abutment surface at said stop position, said moving means moving said latch member about said first mounting pin in rotary travel such that movement of said latch means is confined by said second mounting pin.

13. A rotary disk storage system according to claim 12; wherein said latch means is mounted for rotary travel in a plane parallel to a plane of rotary travel of said rotary actuator carriage, said rotary travel of said latch means being eccentric to said rotary travel of said actuator carriage.

14. A rotary disk storage system according to claim 12; wherein said latch means has a second abutment surface for selectively latching said stop member at said stop position, wherein said stop member is movable in a path by rotary travel of said actuator carriage, and wherein said free position of said latch means is out of said path of said stop member and said latched position of said latch means presents said second abutment surface abuting said stop member and facing the first-mentioned abutment surface of said crash stop means across said path to latch said stop member at said stop position.

15. A rotary disk storage system according to claim 12; wherein said crash stop means includes a spring member having an elongated spring portion adapted to abut said crash stop pin so as to be positioned thereby, a surface of said spring member constituting said abutment surface.

16. A limit stop/latching assembly according to claim 15; wherein said crash stop pin includes a stepped surface having a first step at a first radius for receiving said spring portion to define said stop position, said stepped surface further having a second step at a second radius for receiving said spring portion to define a second stop position.

17. A rotary disk storage system according to claim 12; wherein said latch member includes first and second extended slots for matingly receiving said first and second mounting pins, respectively, said second slot extending in a curve which is a segment of a circle defining the direction of rotary travel of said latch member, and said first slot extending generally perpendicular to said second slot.

18. A rotary disk storage system according to claim 17; wherein said second mounting pin constitutes said crash stop pin.

19. A rotary disk storage system comprising:
a rotary actuator carriage mounted for rotary travel about a shaft and having a stop pin extending therefrom;
crash stop means for limiting rotary travel of said actuator carriage at a stop position, said crash stop means having an abutment surface defining said stop position;
latch means for selectively latching said stop pin at said stop position, said latch means including a latch member and, first and second mounting pins; and
means for moving said latch means about said first mounting pin in rotary travel such that movement of said latch means is confined by said second mounting pin between a free position and a latched position at which said stop pin is latched against said abutment surface at said stop position.

20. A rotary disk storage system according to claim 19; wherein said stop pin is movable in a path by rotary travel of said actuator carriage to abut said abutment surface of said crash stop means, and wherein said latch means has a second abutment surface for selectively latching said stop pin at said stop position, said latch means at said free position being out of said path of said stop pin and said latch means at said latched position presenting said second abutment surface abuting said stop pin and facing the first-mentioned abutment surface of said crash stop means across said path to latch said stop pin at said stop position.

21. A rotary disk storage system according to claim 19; wherein said latch member includes first and second extended slots for matingly receiving said first and second mounting pins, respectively, said second slot extending in a curve generally aligned with the direction of rotary travel of said latch member, and said first slot extending generally perpendicular to said second slot.

22. A rotary disk storage system according to claim 19; wherein said moving means includes solenoid means for moving said latch member about said first mounting pin.

* * * * *